United States Patent

Takahashi et al.

Patent Number: 5,206,358
Date of Patent: Apr. 27, 1993

[54] PROCESS FOR MANUFACTURING PETROLEUM RESIN

[75] Inventors: Akira Takahashi, Sugito; Fumio Ochiai, Ichihara; Yo-ichi Ikeda, Ichihara; Katsumi Minomiya, Ichihara, all of Japan

[73] Assignee: Maruzen Petrochemical Co., Ltd., Tokyo, Japan

[21] Appl. No.: 850,270

[22] Filed: Mar. 12, 1992

[30] Foreign Application Priority Data

Mar. 14, 1991 [JP] Japan .................................. 3-49618

[51] Int. Cl.$^5$ .......................................... C08F 36/00
[52] U.S. Cl. .................................... 526/290; 526/237; 528/491
[58] Field of Search ............... 526/290, 237; 528/494, 528/491

Primary Examiner—Joseph L. Schofer
Assistant Examiner—David Wu
Attorney, Agent, or Firm—Oblon, Spivak, McClelland, Maier & Neustadt

[57] ABSTRACT

A process for manufacturing a petroleum resin is disclosed. The process comprises, polymerizing a petroleum fraction containing unsaturated hydrocarbons in the presence of Friedel-Crafts catalyst, and washing the polymerized product with water or an alkaline solution in the presence of 1-200 ppm of a polymer having a hydroxyl value of 40-120 mg KOH/g and represented by formula (I):

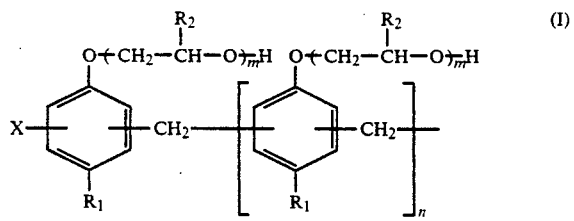

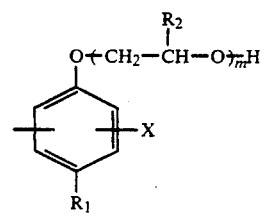

wherein $R_1$ represents a $C_{4-16}$ alkyl group, each $R_2$ individually represents H or a methyl group, each X individually represents H, an alkyl or an aminomethyl group, n is an integer of 0-8, and m is an integer of 8-20. The process can remarkably shorten the time required for the separation of oil from water after the polymerization, producing transparent, light-colored, petroleum resins with a low ash content.

10 Claims, No Drawings

PROCESS FOR MANUFACTURING PETROLEUM RESIN

BACKGROUND OF THE INVENTION

Field of the Invention

This invention relates to a process for manufacturing a petroleum resin, and, more particularly, to a process for manufacturing a light-colored petroleum resin with a high commercial value by remarkably improved operations. The process comprises polymerizing a petroleum fraction of a 10°–280° C. b.p. range containing unsaturated hydrocarbons and produced by thermal cracking of naphtha or the like or by petroleum refining process, or a mixture of such a petroleum fraction and industrially available styrene monomer derivatives, in the presence of a Friedel-Crafts catalyst, and efficiently removing the catalyst residue or ash.

Description of the Background Art

Conventionally, petroleum resins are manufactured by polymerizing a feed stock such as a $C_5$ fraction with a boiling point range of 10°–100° C. or a $C_9$ fraction with a boiling point range of 140°–280° C.; both containing unsaturated hydrocarbons and derived from petroleum refining processes or from thermal cracking of naphtha, etc. as a by-product, or a mixture of such a $C_5$ or $C_9$ fraction and styrene monomer derivatives which are industrially obtainable, in the presence of a Friedel-Crafts catalyst such as aluminum trichloride, boron trifluoride, or a complex containing aluminum trichloride or boron trifluoride. The catalyst is removed from the polymerized mixture by extraction with water or an alkaline solution, following which unreacted fractions in the oil phase are evaporated to obtain a petroleum resin product.

A problem is encountered in the process of removing the catalyst (hereinafter called "washing process"); that is, scum or emulsion is produced from polymer gel and catalyst residue when the polymer liquid (oil phase) and water or an alkaline solution are contacted in a fine particle state, making it difficult to separate the polymer from the water phase in the succeeding settlement process (hereinafter called "oil-water separation process"). This not only poses a serious operational problem, but also contaminates the petroleum resin product with a large amount of ashes derived from the catalyst residue and alkaline ingredients, thereby seriously lowering the properties of the petroleum resin product and eventually spoiling its commercial value.

In an effort to solve this problem inherent to the process for manufacturing petroleum resins employing Friedel Crafts catalyst, a method of adding a surface active agent having a chemical structure of either a polyalkylene oxide adduct of aliphatic dibasic acid or a polyalkylene oxide adduct of fatty acid has been proposed [Japanese Patent Laid-open (ko-kai) No. 152712/1986]. This method, however, is still unsatisfactory; it cannot shorten the time required for the oil-water separation process and cannot completely remove ashes from the product.

In view of this situation, the present inventors have undertaken extensive studies to improve conventional processes and have succeeded in reducing the time required for the separation of the oil from water and minimizing the ashes remained in the resin product by the use of a specific polymer in the washing process in the manufacture of petroleum resins, thereby providing petroleum resins with a high quality.

SUMMARY OF THE INVENTION

Accordingly, an object of the present invention is to provide a process for manufacturing a petroleum resin which comprises:

polymerizing a petroleum fraction containing unsaturated hydrocarbons in the presence of Friedel-Crafts catalyst, and washing the polymerized product with water or an alkaline solution in the presence of 1–200 ppm of a polymer having a hydroxyl value of 40–120 mg KOH/g and represented by formula (I):

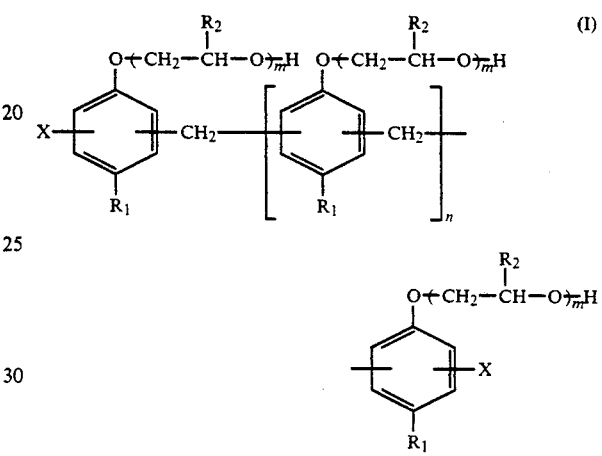

wherein $R_1$ represents a $C_{4-16}$ alkyl group, each $R_2$ individually represents H or a methyl group, each X individually represents H, an alkyl or an aminomethyl group, n is an integer of 0–8, and m is an integer of 8–20.

Other objects, features and advantages of the invention will hereinafter become more readily apparent from the following description.

DETAILED DESCRIPTION OF THE INVENTION AND PREFERRED EMBODIMENTS

Feed stocks used for the manufacture of the petroleum resin of the present invention may be a petroleum fraction with a boiling point of range of 10°–280° C. containing unsaturated hydrocarbons and produced by thermal cracking of naphtha or the like or by a petroleum refining process, or may be styrene monomer derivatives. Of these, a by-product of a thermal cracking process of naphtha, which is inexpensive and readily available, is most preferred.

For the manufacture of aliphatic petroleum resins, a $C_5$ fraction with a boiling point range of 10°–100° C. which is re-fractionated from a fraction of cracked oil with a boiling point range of 10°–280° C. may usually be used singly or blended with other aliphatic olefins or diolefins, etc. as the feed stock. For the manufacture of aromatic petroleum resins, a $C_9$ fraction with a boiling point range of 140°–220° C. obtained from cracked oils can be used singly or used blended with styrene monomer derivatives. For the feed stock of aliphatic-/aromatic copolymer petroleum resins, a fraction obtained from cracked oils with a boiling point range of 10°–280° C. may be used singly or can be used together with the above-described feed stocks for aliphatic petroleum resins or aromatic petroleum resins at an arbitrary blending ratio.

Polymerization of these feed stocks is catalyzed by a Friedel-Crafts catalyst in the presence or absence of a solvent such as benzene, toluene, etc. Halogenated aluminum or its complex such as aluminum trichloride, boron trifluoride or its complex, and the like can be given as examples of the Friedel-Crafts catalyst used in the present invention. Of these, aluminum trichloride or its complex is preferable.

Polymerization for the manufacture of the petroleum resins is carried out under the conditions usually at a temperature of 20°–100° C. for 0.5–6 hours for the reaction in the presence of 0.1–2.0% by weight of the catalyst based on the amount of the feed stock. Any type of processes, including a batch process, semi-batch process, and continuous process, may be employed for the polymerization. The polymerization conditions shall by no means be limited to the above conditions.

The oil phase prepared under these conditions, which consists of the polymer and the catalyst, is then submitted to the washing process, wherein it is contacted with water or an alkaline solution in the presence of a specific polymer in order to deactivate the catalysts and, at the same time, to transfer the deactivated catalysts into the water phase. Thus, deactivation of catalysts and the extraction or removal of the deactivated catalysts are concurrently achieved in the washing process.

The specific polymer used in the present invention is an alkylphenol-formaldehyde polymer having polyalkylene oxide chains represented by general formula (I). The polymer has an effect of preventing scum from being produced and, at the same time, functions as an emulsion breaker. It is essential that the polymer have a hydroxyl value of 40–120 mg KOH/g, and preferably 60–100 mg KOH/g. Otherwise, production of scum or emulsion can not be prevented sufficiently.

The polymer may be prepared by a method known in the art. For example, p-alkylphenol and formaldehyde are reacted for polycondensation according to a known method to prepare a condensation product with a polymerization degree of 2–10, preferably 3–6, followed by graft polymerization of 8–20 moles, preferably 10–16 mols, of an alkylene oxide for 1 mole of phenolic hydroxyl group of the condensation product. Alternatively, the same amount of alkylene oxide may be added in advance to p-alkylphenol to modify phenolic hydroxyl group and the product is reacted with formaldehyde for polycondensation.

p-Alkylphenol, having an alkyl substitutent of 4–16 carbon atoms, may preferably be p-t-butylphenol, p-octylphenol, p-nonylphenol, p-decylphenol, and the like which are readily available in industry. Ethylene oxide or propylene oxide, which are also readily available in industry, may usually be used as an alkylene oxide. Either one of them may be polymerized or both may be copolymerized. In order to promote the emulsion breaking capability of the polymer an aminomethyl group [—$CH_2N(R_3)(R_4)$], which is prepared by reacting formaldehyde and an aliphatic primary or secondary amine, may be introduced into the aromatic ring of the terminal position of the above polymer. Both $R_3$ and $R_4$ in said formula for the aminomethyl group are alkyl groups usually of $C_{16}$ or smaller, although the carbon numbers are not strictly limited.

The polymer of the present invention may be used as is or may be used in the form of an essential ingredient of a surface active agent. The polymer is added to the polymerized liquid (oil phase) in an amount to make its concentration 1–200 ppm. The prevention of scum and emulsion formation will be inadequate when the concentration of the polymer is out of this range. The manner in which the polymer is added is not particularly limited: the polymer can be added either in the oil phase or to the water phase, as is or dissolved in a solvent such as toluene, etc. The addition to the oil phase is more preferable.

An alkaline solution commonly used for washing, e.g., aqueous solutions of sodium hydroxide, potassium hydroxide, calcium hydroxide, magnesium hydroxide, or aqueous ammonia, can be used in the washing step of the present invention.

The amount of water or an alkaline solution used in the washing process of the present invention is not particularly limited. Usually 50–200 parts of washing liquid to 100 parts of the polymerized liquid (oil phase) may be used. Washing may be performed by an oilwater contact method in an agitation vessel or through a perforated tray tower without any restrictions as to the type of processes; batch, semi-batch or continuous. The temperature of washing process is neither limited, however, the range between 50 and 100 ° C. may be most effective for the present invention. The ash contained in the oil phase can substantially be removed by the method described above, but it is more preferable to wash the separated oil phase again with water. There is no need to add the polymer further at this stage.

Other features of the invention will become apparent in the course of the following description of the exemplary embodiments which are given for illustration of the invention and are not intended to be limiting thereof.

EXAMPLES

Polymers A–C. used in Examples and Comparative Examples are presented in Table 1. These Polymers were prepared according to a known method; each polymer was synthesized by the polycondensation of an alkylphenol and formaldehyde and then ethylene oxide was reacted by the graft polymerization with the phenolic hydroxyl group of the polycondensation compound. For comparison, a polyethylene adduct of succinic acid (Polymer D, average molecular weight: 3,000), which has a different molecular structure from those of present invention but is known as an emulsion breaker having similar effects, was also synthesized according to a known method.

TABLE 1

| Polymer | $R_1$ | $R_2$ | X | n | m | Hydroxyl Value (mg KOH/g) |
|---|---|---|---|---|---|---|
| A | $C_9H_{19}$ | H | H | 3 | 12 | 77 |
| B | $C_8H_{17}$ | H | H | 2 | 4 | 151 |
| C | $C_2H_5$ | H | H | 4 | 12 | 89 |
| D | polyethylene oxide adduct of succinic acid* | | | | | 43 |

*Structure: [—$CH_2COO(CH_2CH_2O)_xH$]$_2$

In Table 1, $R_1$, $R_2$, X, n, and m designate those of Formula (I). n and m are the average degrees of polymerization of each polymer calculated from the number average molecular weight of polymers measured by NMR and GPC (manufactured by TOSOH Co.; model HLC-802). The hydroxyl value was determined according to JIS K-0070; the calculated values from average molecular weights showed good agreement with these values.

COMPARATIVE EXAMPLE 1

Into a 1 liter pressure-resistant glass autoclave equipped with a stirrer was charged 3.0 gm of a complex catalyst (methyl acetate/aluminum trichloride) sealed in a glass ampule. After replacing the air in the autoclave thoroughly with nitrogen gas, 200 gm of a $C_5$ fraction with a boiling point range of 20°–60° C. produced from a by-product of a naphtha cracking process was charged.

Major components of the fraction were 25% by weight of diolefins including isoprene, 1,3-pentadiene, cyclopentadiene, and the like; and 18% by weight of monoolefins including 2-methyl-1-butene, 2-methyl-2-butene, cyclopentene, and the like.

The autoclave was heated up to 60° C. while gently stirring the contents. Then, the autoclave was subjected to vigorous stirring to destruct the ampule and to initiate the polymerization. The reaction was continued for 1 hour to proceed the polymerization, while cooling the outside the container with ice cooled water at an earlier stage of the polymerization and then keeping the polymerization temperature at 80° C. by heating.

After the completion of the reaction, 100 gm of 2% aqueous solution of sodium hydroxide was added to the reaction mixture to deactivate the catalyst and to terminate the polymerization, and the catalyst residue was extracted with the solution by stirring the content at 80° C. for 15 minutes. The reaction mixture was allowed to stand still at the same temperature for 30 minutes to observe whether or not it separated into two layers. The oil and water remained as a single emulsified layer, proving that it is difficult to separate them within 30 minutes.

To the oil phase, which was obtained after the mixture was allowed to stand for a longer period of time and cooling to effect the phase separation, was added 100 gm of pure water. The same washing procedure as above was repeated and the product was allowed to stand still. 56 gm of an aliphatic petroleum resin was obtained by removing the unreacted oil and polymers with a deficient polymerization degree from the separated oil phase. The resin possessed a softening point of 103° C. and Gardner color 7. Its appearance was not transparent but rather opaque due to ashes contained therein.

In Table 2, the standing hours required for oil-water separation after washing with the sodium solution, and the ash content, color and total chlorine content of the resins of all examples obtained from each oil phase were presented altogether.

TABLE 2

| | Petroleum Resin | Polymer | Amount of Polymer added (ppm) | Period of oil-water separation (min.) | Properties of Resin | | | |
|---|---|---|---|---|---|---|---|---|
| | | | | | Softening Point (°C.) | Color | Ash Content (ppm) | Total Chlorine (ppm) |
| Comparative Example 1 | $C_5$ | — | — | 40 | 103 | 7 | 230 | 410 |
| Example 1 | $C_5$ | A | 40 | 3 | 103 | 6 | <10 | 350 |
| Comparative Example 2 | $C_5/C_9$ | — | — | >120 | 96 | 11 | 670 | 590 |
| Example 2 | $C_5/C_9$ | A | 5 | 7 | 97 | 9 | 25 | 250 |
| Example 3 | $C_5/C_9$ | A | 40 | 3 | 96 | 8 | 15 | 230 |
| Example 4 | $C_5/C_9$ | A | 150 | 5 | 95 | 7 | <10 | 210 |
| Comparative Example 3 | $C_5/C_9$ | A | 0.5 | 20 | 97 | 9 | 190 | 370 |
| Comparative Example 4 | $C_5/C_9$ | A | 250 | 20 | 95 | 9 | 120 | 280 |
| Comparative Example 5 | $C_5/C_9$ | B | 40 | >120 | 96 | 10 | 560 | 490 |
| Comparative Example 6 | $C_5/C_9$ | C | 40 | 90 | 96 | 9 | 330 | 410 |
| Comparative Example 7 | $C_5/C_9$ | D | 40 | 10 | 97 | 8 | 50 | 450 |
| Comparative Example 8 | $C_9$ | — | — | 25 | 97 | 12 | 110 | 850 |
| Example 5 | $C_9$ | A | 40 | 5 | 96 | 10 | 15 | 410 |
| Comparative Example 9 | $C_9$ | D | 40 | 10 | 96 | 10 | 50 | 460 |

Separation time: Time required for the boundary of oil and water phase becomes clear after the cease of stirring.
Softening point: JIS K-2207-1980 (Ring and ball method)
Color: ASTM D-154-58 (Melting method)
Ash content: JIS K-2272-1980
Total chlorine: JIS K-0101

EXAMPLE 1

Polymerization was performed according to the same procedures as in Comparative Example 1, except that a 30 wt. % solution of Polymer A dissolved in toluene was added to the polymerized product after the completion of polymerization in an amount to make the concentration of Polymer A 40 ppm.

The separation of oil and water was very smooth, and the resin obtained was transparent and exhibited a lighter color in Gardner color scale.

COMPARATIVE EXAMPLE 2

133 gm of a $C_5$ fraction with a boiling point range of 20°–60° C, the same fraction used in Comparative Example 1, and 67 gm of a fraction with a boiling point range of 140°–220° C. prepared from a by-product of a naphtha cracking process were charged into an autoclave. The latter fraction contained the major components for the polymerization; 25% by weight of aromatic olefins, including styrene, α-methylstyrene, o-, m-, p-vinyltoluene, indene, and the like.

The same procedures of polymerization and washing employed in Comparative Example 1 were followed, except that 1.5 gm of the polymerization catalyst was used. The separation of oil from water in this Comparative Example was proven to be more difficult than Comparative Example 1.

The unreacted oil and polymers with an insufficient polymerization degree were removed from the separated oil phase to obtain 66 gm of an aliphatic/aromatic copolymer petroleum resin. The resin had a softening point of 96° C., Gardner color of 11, and contained a large amount of ashes so that it gave the appearance quite opaque, entirely lacking in transparency.

EXAMPLES 2–4

Polymerizations were performed in the same manner as in Comparative Example 2. After the polymerizations, a prescribed amount (as shown in Table 2; converted as concentrations of Polymer A) of 30 wt. % solution of Polymer A dissolved in toluene was added to each polymerized mixture. The mixture was washed with a sodium hydroxide solution and then with water in the same manner as in Comparative Example 2.

The separation of oil and water phases was remarkably smooth and the resins prepared showed a lighter Gardner color and excellent transparency. It was confirmed that the contamination of surface active agents into resins had no adverse effects to the properties of adhesive tapes which will be a major application of the resin of the present invention.

COMPARATIVE EXAMPLE 3-4

The same procedures as in Example 2-4 were followed, except that the amount of Polymer A was adjusted to 0.5 ppm and 250 ppm, respectively.

It required a little longer hours for separation of oil and water. The resins prepared were slightly less transparent and contained a little higher amount of ashes.

COMPARATIVE EXAMPLE 5-6

The same procedures as in Examples 2-4 were followed, except that 40 ppm of Polymer B (Comparative Example 5) or Polymer C. (Comparative Example 6) was added.

The separation of oil and water in a short period of time was difficult as in the case of Comparative Example 2. The resins obtained contained very high amounts of ashes and their appearance were opaque.

COMPARATIVE EXAMPLE 7

The same procedures as in Examples 2-4 were followed, except that 40 ppm of Polymer D was added. Although the time required for the separation of oil and water was reduced, a thin lace of scum and foam were observed at the interface and they were never diminished even after having been left stand for a long period of time.

Even though the resin had a low ash content, its chlorine content was high, proving a poor desalination capacity of Polymer D.

COMPARATIVE EXAMPLE 8

The same procedures as in Comparative Example 1 were followed, except that 200 gm of a fraction with a boiling point range of 140-220° C. employed in Comparative Example 2 was used as a starting material for the polymerization together with 1.5 gm of the catalyst and the polymerization was carried out at temperature of 70° C. A clear interface of oil and water emerged after 25 minutes of standing, however, the oil phase remained milky due to a large water content therein and a lot of scum was observed afloat. It required many hours for the oil phase to become clear. 51 gm of an aromatic resin was obtained from the oil phase. The resin had a softening point of 97° C, Gardner color of 12, and was slightly lacking in transparency.

EXAMPLE 5

The same procedures as in Comparative Example 8 were followed, except that Polymer A was added to make its content 40 ppm. The separation of oil from water was very smooth, producing a transparent, yellowish brown oil phase. No scum was floating at the interface of oil and water. 54 gm of a resin was obtained from the oil phase. The resin was transparent and had a lighter Gardner color. The resin had a softening point of 96° C., Gardner color of 10, and an ash content of 15 ppm. COMPARATIVE EXAMPLE 9

The same procedures as in Comparative Example 8 were followed, except that Polymer D was added in an amount to make its content 40 ppm. The addition of Polymer D exhibited some effects on shortening the time required for the separation of oil from water, and helped obtaining a clear interface of oil and water to some degree, however, a large amount of water was still remained in the oil phase making the liquid turbid in ocher and scum was observed at the interface. 53 gm of a transparent resin was produced from the oil phase. The resin had a softening point of 96° C., Gardner color of 10 and an ash content of 50 ppm.

As can be seen from the foregoing descriptions, the present invention, which adopts a specific polymer in the washing process of the petroleum resin manufacturing, can remarkably shorten the settlement time required for the separation of oil from water after the polymerization by preventing scum and emulsion from being produced during the washing procedure. It also helps to provide a petroleum resin with a significantly low ash content, more transparent, lighter in color.

The process of the present invention, therefore, can greatly improve the production efficiency of petroleum resins and contribute to the provision of petroleum resins with excellent qualities and a higher commercial value.

Obviously, numerous modifications and variations of the present invention are possible in light of the above teachings. It is therefore to be understood that within the scope of the appended claims, the invention may be practiced otherwise than as specifically described herein.

What is claimed is:

1. A process for manufacturing a petroleum resin which comprises:
   polymerizing a petroleum fraction containing unsaturated hydrocarbons in the presence of Friedel-Crafts catalyst, and
   washing the polymerized product with water or an alkaline solution in the presence of 1-200 ppm of a polymer having a hydroxyl value of 40-120 mg KOH/g and represented by formula (I):

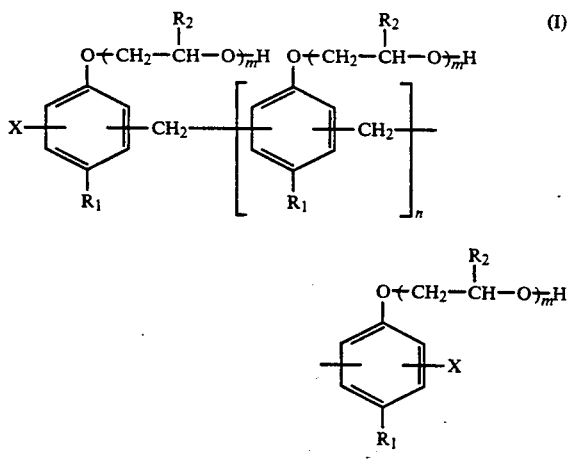

wherein $R_1$ represents a $C_{4-16}$ alkyl group, each $R_2$ individually represents H or a methyl group, each X individually represents H, an alkyl or an aminomethyl group, n is an integer of 0-8, and m is an integer of 8-20.

2. A process according to claim 1, wherein said petroleum fraction containing unsaturated hydrocarbons is one or more members selected from the group consisting of petroleum fractions having a boiling point range of 10°–280° C. and produced by a thermal cracking process of naphtha, petroleum fractions having a boiling point range of 10°–280° C. and produced by a petroleum refining process, aliphatic olefins, aliphatic diolefins, and styrene monomer derivatives.

3. A process according to claim 1, wherein said Friedel-Crafts catalyst is one or more members selected from the group consisting of aluminum trichloride, boron trifluoride, a complex aluminum trichloride, and a complex boron trifluoride.

4. A process according to claim 1, wherein said Friedel-Crafts catalyst is aluminum trichloride or a complex aluminum trichloride, or both.

5. A process according to claim 1, wherein $R_1$ is a $C_{4-12}$ alkyl group, n is an integer of 1–4, and m is an integer of 10–16 in formula (I) and said polymer has a hydroxyl value of 60–100 mg KOH/g.

6. A process according to claim 5, wherein $R_1$ is a t-butyl, octyl, nonyl, or decyl group.

7. A process according to claim 6, wherein $R_1$ is nonyl group, X is hydrogen, n is 3, and m is 12.

8. A process according to claim 1, wherein 50–200 parts by weight of water or an alkaline solution is used for 100 parts by weight of the polymerized product.

9. A process according to claim 1, wherein said alkaline solution is one or more members selected from the group consisting of an aqueous solutions of sodium hydroxide, potassium hydroxide, calcium hydroxide, magnesium hydroxide, and aqueous ammonia.

10. A process according to claim 1, wherein said washing of the polymerized product with water or an alkaline solution is carried out at a temperature of 50°–100° C.

* * * * *